T. L. MAY.
VEHICLE WHEEL.
APPLICATION FILED MAY 2, 1910.
977,463.
Patented Dec. 6, 1910.
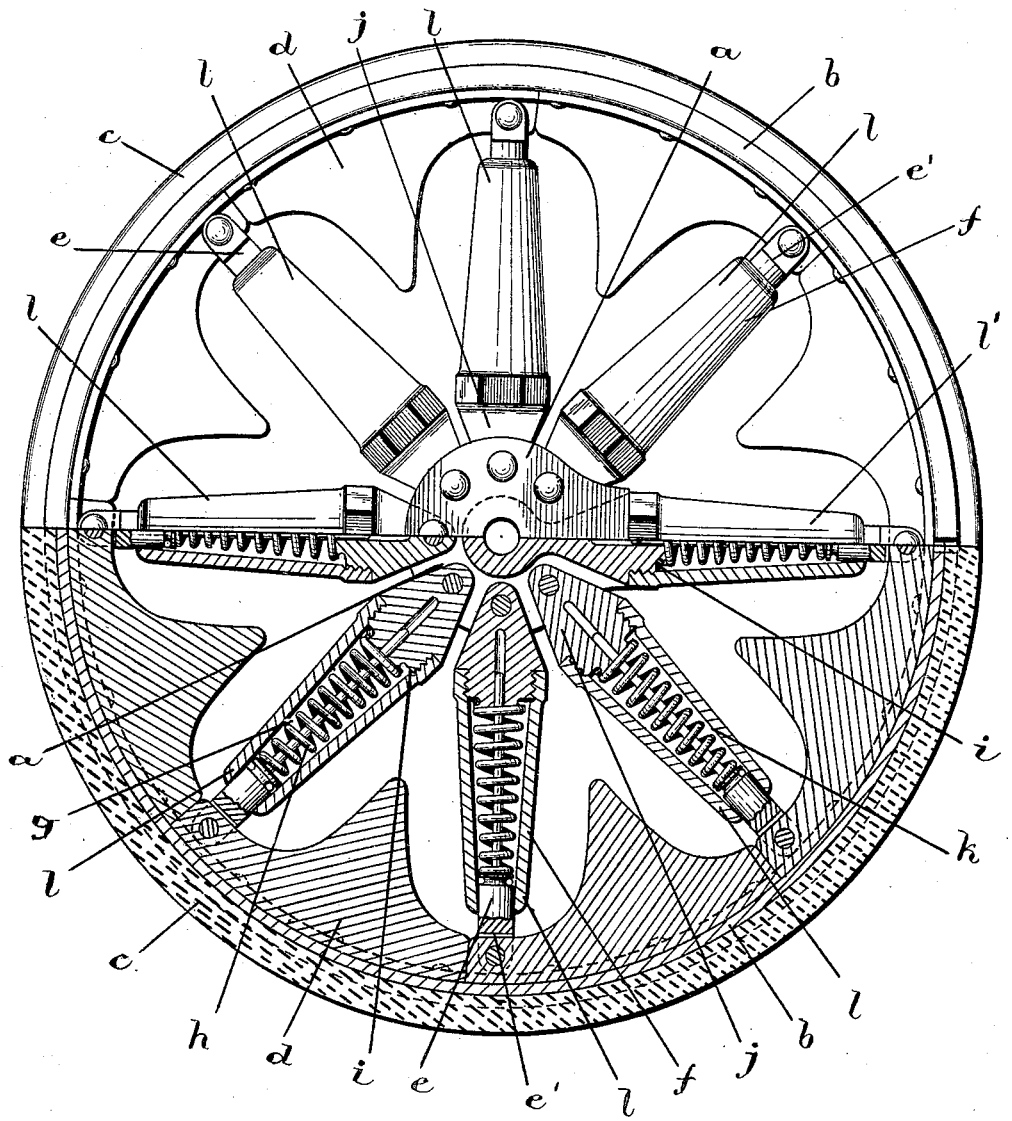
WITNESSES:
INVENTOR:
Thomas Leslie May.

UNITED STATES PATENT OFFICE.

THOMAS LESLIE MAY, OF TORONTO, ONTARIO, CANADA, ASSIGNOR OF ONE-HALF TO EDWARD GEORGE GOODERHAM, OF TORONTO, CANADA.

VEHICLE-WHEEL.

977,463.

Specification of Letters Patent.

Patented Dec. 6, 1910.

Application filed May 2, 1910. Serial No. 558,980.

*To all whom it may concern:*

Be it known that I, THOMAS LESLIE MAY, of the city of Toronto, in the county of York and Province of Ontario, Canada, have invented certain new and useful Improvements in Vehicle-Wheels; and I hereby declare that the following is a full, clear, and exact description of the same.

My invention relates to that class of vehicle wheel in which the hub is yieldingly suspended centrally within the rim by hollow spokes provided with springs maintaining a uniform resiliency, absorbing the vibration and cushioning the jar created during the revolution of the wheel. Heretofore in this class of vehicle wheel it has been the practice to pivotally connect the inner ends of all the spokes to the hub and to provide their outer ends with plungers pivotally connected to the rim and to use within the hollow spokes coiled springs engaging the inner ends of the plungers and abutments at the hub ends of the spokes, the springs being of uniform tension to maintain the hubs centrally within the rim; or to rigidly connect the inner ends of the spokes to the hub and the plungers to the rim, and to use coiled springs to maintain the hub centrally within the rim. In the former construction, owing to the absence of a rigidly connected driving spoke or spokes, the rim has greater or less circumferential motion independent of the hub which detracts from the driving power and control of the wheel, and in the latter construction the rigid connection of all the spokes to the hub detracts from the flexibility and resiliency of the wheel.

The object of my invention is to combine in the vehicle wheel the resiliency of the former construction, and the driving power and control of the latter construction, and this I accomplish by providing the vehicle wheel with one or more driving spokes rigidly connected to the hub, and pivotally connecting the remaining spokes thereto, all the spokes having at their outer ends plungers pivotally connected to the rim, coiled springs being combined with the spokes to maintain the central relation of the hub to the rim, the bore of the spokes being preferably of a tapering character, and the springs of a corresponding shape, the convergence of the bore and springs being toward the rim.

For an understanding of the invention, reference is to be had to the following specification and drawings, in which the figure is an elevation partly in section of the vehicle wheel.

Like characters of reference refer to like parts throughout the specification and drawings.

In the figure, the hub *a* is centrally placed within the rim *b*, which may be either of a unitary or segmental character and provided with a tire *c* which may be of rubber or rubber composition, to increase the resiliency of the device and render it noiseless as it travels upon the pavement.

Forming part of the rim *b* is a segmental web *d* to which the outer ends of the plungers *e* are pivotally connected, the inner ends of the plungers being contained within the outer ends of the spokes *f*, there being sufficient clearance between the ends of the spokes and shoulders *e'* on the plungers to allow of the movement of the hub. The spokes have tapering bores *g* converging toward their outer ends and contained within the bores *g* are coiled springs *h* tapered to correspond with the taper of the bores. The outer ends of the coiled springs *h* engage the inner ends of the plungers *e*, and the inner ends of the springs engage abutments *i* near the hub ends of the spokes.

For convenience of manufacture, each spoke consists of a solid body part *j* connected to the hub *a* and a hollow sleeve *k* threaded at its inner end upon the body part, but the spokes may be made so that the body part and sleeve are unitary.

In the accompanying drawings I have shown eight spokes, seven of which are pivotally connected at their inner ends to the hub *a*, with the eighth or driving spoke rigidly connected at its inner end to the hub. The seven spokes pivotally connected to the hub are indicated by the reference characters *l* and the eighth or driving spoke by the reference character *l'*.

When driving power is applied to the hub, the driving spoke *l'* causes the rim *b* to revolve unitedly with the hub *a*, and when the revolution of the hub is arrested it causes a simultaneous arrest of the rim. The revolution and arrest of the rim in unison with the hub is necessary to obtain the full driving power and control of the wheel. I find that under ordinary working conditions one fixed spoke is sufficient to effect this result, but it may be necessary for wheels working under abnormal conditions and heavy loads, to use two or more fixed spokes, but the number of fixed spokes will vary according to the working condition, and in any case will be less than the total number of spokes in the wheel, as otherwise the resiliency of the wheel will be impaired at the expense of its driving power.

The action of the related parts is similar to that of other wheels of the same character, and consequently it will not be necessary to describe in detail the effect of the springs during the bound and rebound of the hub, further than to say that owing to the tapering character of the springs, and the bores of the spokes, the coils of the former engage with the surfaces of the latter, as the plungers recede within the spokes and the friction of the spring coils against the surfaces of the bores assist in retarding the bound of the hub and limit its downward movement.

Having thus fully described my invention what I claim as new and desire to secure by Letters Patent is:

In a vehicle wheel having the hub resiliently suspended centrally within the rim, a set of spokes with outwardly converging bores, one of the spokes being rigidly connected at its inner end to the hub, and the remaining spokes being pivotally connected at their inner ends to the hub, plungers pivotally connected at their outer ends to the rim and having their inner ends movable within the spokes, and tapering springs within the spokes bearing against the plungers to yieldingly and resiliently maintain the hub centrally within the rim.

Toronto, April 26th, 1910.

THOMAS LESLIE MAY.

Signed in the presence of—
  CHAS. H. RICHES,
  H. L. TRIMBLE.